(12) United States Patent
Tonooka

(10) Patent No.: US 7,002,575 B2
(45) Date of Patent: Feb. 21, 2006

(54) DESIGN SUPPORTING PROGRAM, DESIGN SUPPORTING METHOD, DESIGN SUPPORTING APPARATUS AND COMPUTER-READABLE RECORDING MEDIUM RECORDED WITH DESIGN SUPPORTING PROGRAM

(75) Inventor: Mitsuhiro Tonooka, Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 304 days.

(21) Appl. No.: 10/340,587

(22) Filed: Jan. 13, 2003

(65) Prior Publication Data
US 2003/0187541 A1    Oct. 2, 2003

(30) Foreign Application Priority Data
Mar. 28, 2002  (JP)  .............................. 2002-092442

(51) Int. Cl.
*G06T 15/00*  (2006.01)

(52) U.S. Cl. ........................... 345/424; 715/102; 703/1

(58) Field of Classification Search ................ 345/420, 345/419, 441; 703/1; 715/102
See application file for complete search history.

(56) References Cited

U.S. PATENT DOCUMENTS

| | | | | |
|---|---|---|---|---|
| 5,197,120 A | * | 3/1993 | Saxton et al. ................ 345/661 |
| 5,444,836 A | * | 8/1995 | Hollingsworth et al. ..... 345/634 |
| 5,625,827 A | * | 4/1997 | Krause et al. ............... 715/502 |
| 5,689,435 A | * | 11/1997 | Umney et al. .................. 703/1 |
| 5,701,403 A | * | 12/1997 | Watanabe et al. ........... 345/419 |
| 5,838,328 A | * | 11/1998 | Roller ......................... 345/420 |
| 5,949,693 A | * | 9/1999 | Tandler ......................... 703/1 |
| 6,232,985 B1 | * | 5/2001 | Chase et al. ................. 345/441 |

* cited by examiner

*Primary Examiner*—Phu K. Nguyen
(74) *Attorney, Agent, or Firm*—Staas & Halsey LLP

(57) ABSTRACT

A design supporting program, a design supporting method, a design supporting apparatus and a computer-readable recording medium recorded with a design supporting program, wherein assignment of graphical elements is simplified, and an amount of work required to input dimensions of graphical elements is reduced, by adding feature dependent graphical interpretation.

14 Claims, 5 Drawing Sheets

(A)

(B)

DESIGN SUPPORTING PROGRAM, DESIGN SUPPORTING METHOD, DESIGN SUPPORTING APPARATUS AND COMPUTER-READABLE RECORDING MEDIUM RECORDED WITH DESIGN SUPPORTING PROGRAM

FIELD OF THE INVENTION

The present invention relates to a technique for reducing an amount of work required to input dimensions of graphical elements in CAD (Computer Aided Design) systems in which three-dimensional shapes are created using existing two-dimensional drawings.

RELATED ART OF THE INVENTION

In recent years, CAD systems using computers have been utilized extensively for designing manufactured products, buildings and the like, in order to shorten design time and improve design quality. Some of three-dimensional CAD systems are provided with functions for reducing an amount of work required to input dimensions by utilizing existing graphical element information for two-dimensional drawings, instead of inputting linear dimensions and angular dimensions of graphical elements directly by numerical values.

Such functions are as follows: (1) when one graphical element (limited to a line segment) on a two-dimensional drawing is assigned, its length is designated as a linear dimension; (2) when two parallel graphical elements on a two-dimensional drawing are assigned, their distance is designated as a linear dimension; (3) when two graphical elements (limited to line segments) extending at a predetermined angle on a two-dimensional drawing are assigned, the angle between them is designated as an angular dimension.

Incidentally, in drawing creation, there are many cases of omitting the middle part of graphical element with long shape, creating graphical elements by single precision, and changing only the dimension values of graphical element without changing its shape according to the design change. At this time, since the graphical elements do not represent the correct shapes, if the length of graphical element or the separation between two graphical elements is designated as a linear dimension, then there is a possibility that the linear dimension values are not correct.

Furthermore, when the angular dimension of a taper is input, in the case where an angle between two graphical elements is an angular dimension, there is a possibility that there is no graphical element serving as an angle reference. On the other hand, even if there is a graphical element serving as an angle reference, since the designer acknowledges that the angle reference of the taper is along the direction of its axis, two graphical elements should be assigned, which complicates the operation. Furthermore, when the thickness of a shell (linear dimension between two graphical elements) is input, two graphical elements should be assigned, so the operation is complicated similarly to the case of taper.

Therefore, the present invention takes the conventional problems above into consideration, with an object of providing a design supporting technique in which the assignment of graphical elements is simplified and an amount of work required to input dimensions of graphical elements is reduced by adding feature dependent graphical interpretation.

SUMMARY OF THE INVENTION

In order to achieve the above object, in a design supporting technique according to the present invention, a graphical element or a point between two graphical elements is assigned on a two-dimensional drawing, the type of feature associated with the assigned graphical element or the point is determined, and based on the type of feature determined, a dimension that characterizes the feature is calculated.

According to such a construction, when obtaining the dimension that characterizes the feature, if a graphical element or a point between two graphical elements is assigned on a two-dimensional drawing, the dimension is calculated on the basis of the type of feature associated with the assigned graphical element or point. As a result, the graphical element assignment operation is simplified, and thus it is possible to reduce an amount of work required to input dimensions of graphical elements.

Here, when the type of feature is a taper, it is desirable to designate an angle formed by the assigned graphical element and an axis direction of the taper, as an angular dimension of the taper. Furthermore, when the type of feature is a taper, the smaller of an angle formed by the assigned graphical element and a vertical direction, and an angle formed by the graphical element and a horizontal direction may be designated as an angular dimension of the taper. Moreover, when the type of feature is a shell, it is desirable to designate a distance between a graphical element with the shortest distance from the assigned point and another graphical element on an opposite side of the point, as a linear dimension indicating a thickness of the shell.

According to such a construction, when obtaining the angular dimension of a taper, the angular dimension that characterizes the taper is calculated, by only assigning one graphical element forming the taper. As a result, not only is a graphical element serving as a reference of the angular dimension not necessary, but it is also possible to obtain an angular dimension by operations consistent with an operator's understanding. On the other hand, when obtaining the thickness of a shell, the linear dimension that characterizes the shell is calculated, by only assigning a point between two graphical elements. As a result, similarly to when obtaining the angular dimension of a taper, it is possible to obtain a linear dimension by operations consistent with an operator's understanding.

Additionally, in another design supporting technique according to the present invention, a graphical element is assigned on a two-dimensional drawing, a dimensional element associated with the assigned graphical element is obtained, and a character string representing a dimension value is extracted from the obtained dimensional element, to be designated as a dimension of the assigned graphical element.

According to such a construction, when obtaining the dimensions of a graphical element, if the graphical element is assigned directly, then the dimension values are extracted from the dimensional element associated with the graphical element. Therefore, for example, even if the middle part of a drawing element with a long shape is omitted, or the graphical element is created by single precision, or the graphical element and the dimension value are not consistent with each other, it is possible to obtain a correct dimension value of the graphical element.

Other objects and aspects of this invention will be apparent from the following description of embodiments associated with appended drawings.

PREFERRED EMBODIMENT

As follows is a detailed description of the present invention with reference to the appended drawings.

Figure 1:
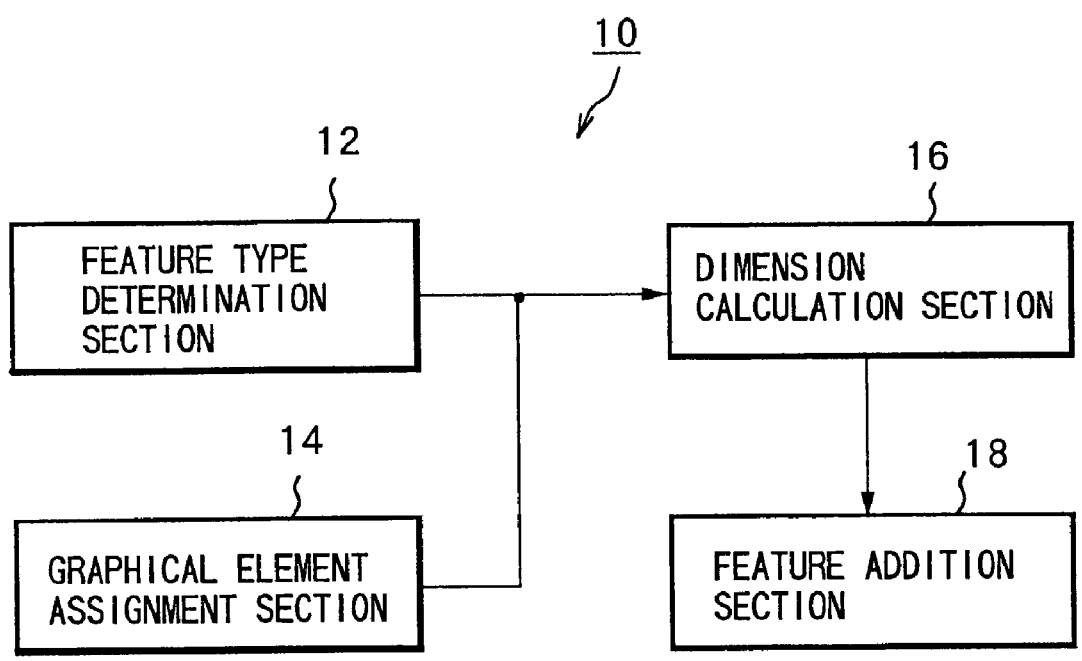
FIG. 1 is a structural diagram showing a first embodiment of a design supporting apparatus embodying the present invention.

FIG. 1 shows a first embodiment of a design supporting apparatus embodying the present invention.

A design supporting apparatus 10 comprises a computer provided with at least a central processing unit (CPU) and a memory, and various functions related to design support are realized by a program loaded into the memory. To be specific, the design supporting apparatus 10 comprises a feature type determination section 12, a graphical element assignment section 14, a dimension calculation section 16, and a feature addition section 18.

In the feature type determination section 12, using a "base model" called a basic feature as a parent, the type of feature for adding a taper, a shell or the like is determined. The feature type may be determined, for example, by assignment operations by an operator (designer), or by attributes of a graphical element. In the graphical element assignment section 14, various graphical elements comprising a two-dimensional drawing or a point between two graphical elements are assigned by assignment operations by an operator. In the dimension calculation section 16, dimensions that characterize a feature are calculated based on the feature type determined by the feature type determination section 12, and the graphical element (referred to hereunder as "assigned element") or the point between graphical elements (referred to hereunder as "assigned point") assigned by the graphical element assignment section 14. In the feature addition section 18, a feature that reflects a dimension calculated by the dimension calculation section 16 is added to the basic feature.

Here, a type determination function and type determination means, an assignment function and assignment means, and a dimension calculation function and dimension calculation means are realized in software by the feature type determination section 12, the graphical element assignment section 14 and the dimension calculation section 16, respectively.

Figure 2:
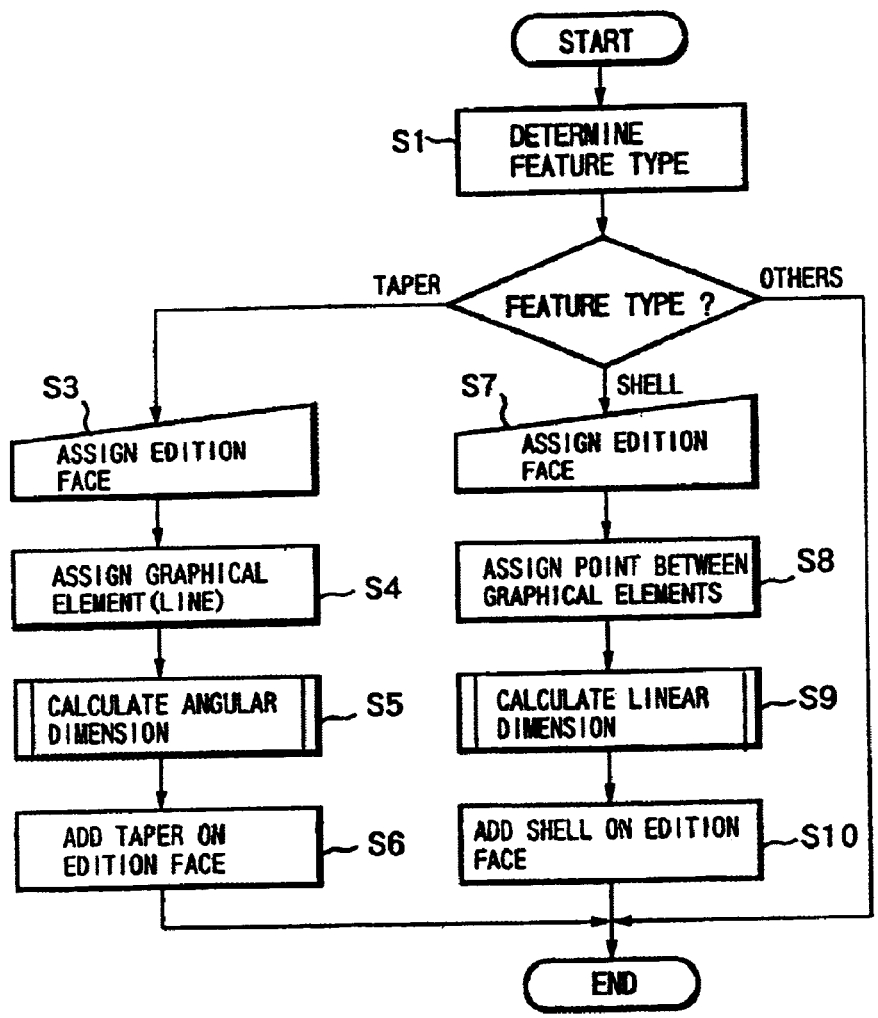
FIG. 2 is a flow chart showing processing to be executed in the above embodiment.

Next is a description of the operation of this design supporting apparatus 10 with reference to the flow chart shown in FIG. 2.

In step 1 (abbreviated to "S1" in the figure, and similarly hereunder), the type of feature to be added to a basic feature is determined. Here, the processing in step 1 corresponds to the type determination function and the type determination means.

In step 2, branching according to the type of feature is performed. That is, if the type of feature is "taper", control proceeds to step 3, if the type is "shell", control proceeds to step 7, and if the type is "others", processing is terminated.

In step 3 through step 6, processing when the feature type is a taper is executed. That is, in step 3, an edition face of the basic feature to which a taper, being a feature, is added is assigned by assignment operations by the operator. In step 4, line segments serving as graphical elements forming a taper on a two-dimensional drawing are assigned by assignment operations by the operator as shown in (A) of FIG. 3 and (A) of FIG. 4. In step 5, a subroutine is called for calculating an angular dimension of the taper. In step 6, a taper that reflects the calculated angular dimension is added to the edition face of the basic feature. The processing in step 4 corresponds to the assignment function and the assignment means, and the processing in step 5 corresponds to the dimension calculation function and the dimension calculation means.

Here is a description of calculation methods adopted in the subroutine for calculating the angular dimension of the taper.

Figure 3:
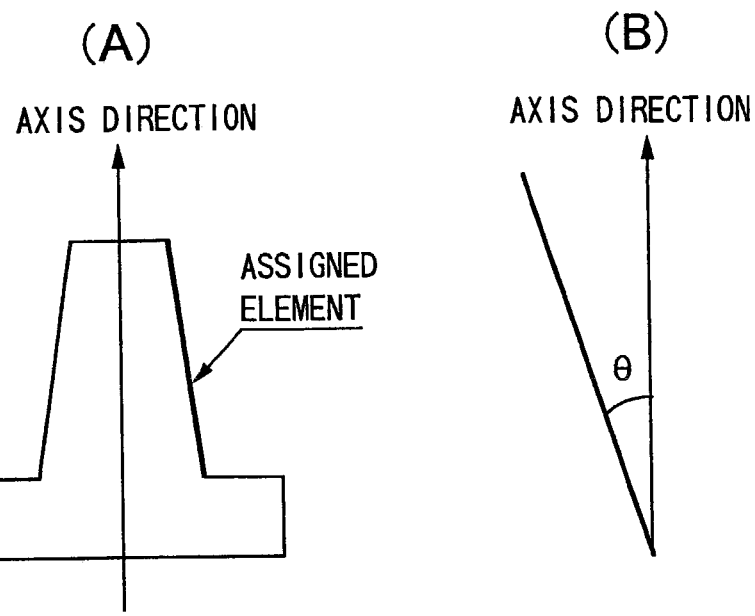
FIG. 3 shows a first method of calculating an angular dimension of a taper, in which (A) is an explanatory diagram of the time when a graphical element is assigned, and (B) is an explanatory diagram of a specific method of calculating an angular dimension.
Figure 4:
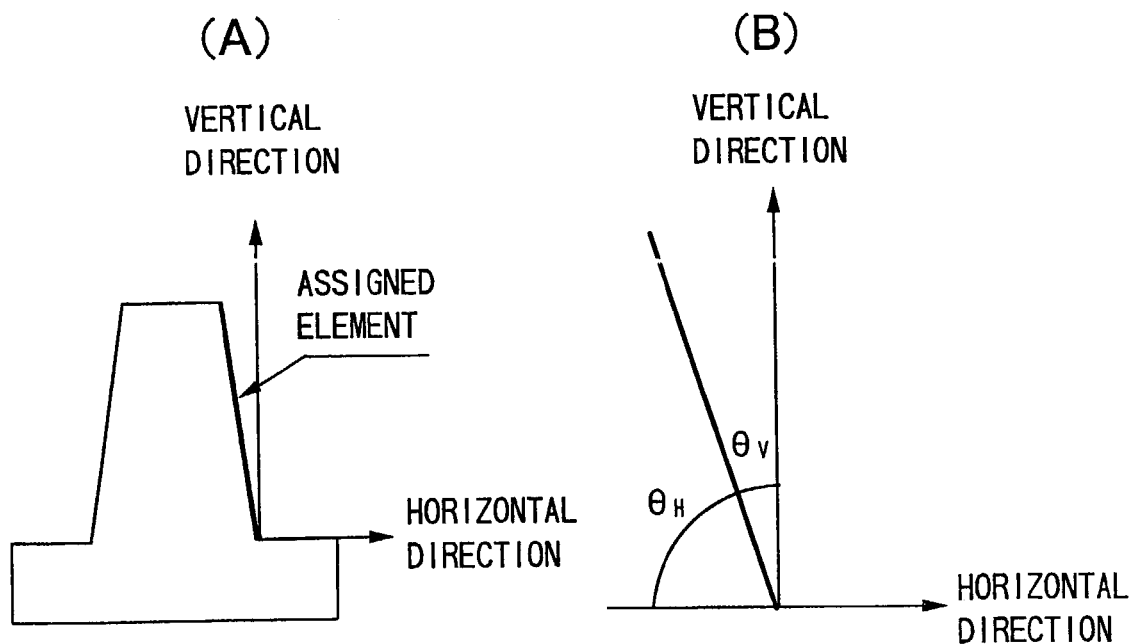
FIG. 4 shows a second method of calculating an angular dimension of a taper, in which (A) is an explanatory diagram of the time when a graphical element is assigned, and (B) is an explanatory diagram of a specific method of calculating an angular dimension.

In a first method, as shown in (A) of FIG. 3, when an assigned element is assigned, its axis direction is calculated by a known method. Then, as shown in (B) of FIG. 3, an angle θ formed by the axis direction and the assigned element is calculated, and this angle is designated as the angular dimension of the taper. Furthermore, in a second method, as shown in (A) of FIG. 4, when an assigned element is assigned, as shown in (B) of FIG. 4, an angle $θ_V$ formed by the vertical direction and the assigned element, and an angle $θ_H$ formed by the horizontal direction and the assigned element, are calculated, respectively. Then, the angle $θ_V$ and the angle $θ_H$ are compared with each other, and the smaller angle is designated as the angular dimension of the taper.

Figure 5:
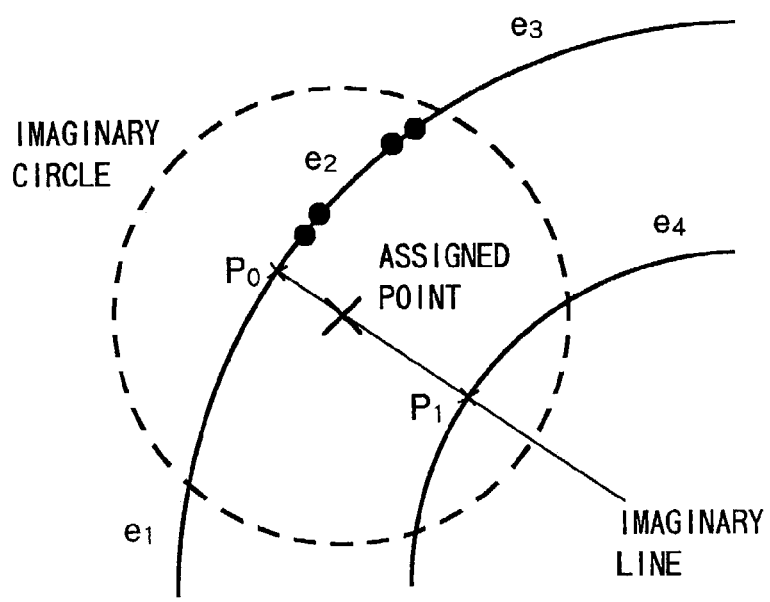
FIG. 5 is an explanatory diagram of a method of calculating a thickness of a shell.

On the other hand, in step 7 through step 10, processing when the feature type is a shell is executed. That is, in step 7, an edition face of the basic feature to which a shell, being a feature, is added is assigned by assignment operations by the operator. In step 8, a point (assigned point) between two graphical elements forming a shell on a two-dimensional drawing is assigned by assignment operations by the operator as shown in FIG. 5. In step 9, a subroutine is called for calculating a thickness (linear dimension) of the shell. In step 10, a shell that reflects the calculated linear dimension is added to the edition face of the basic feature. The processing in step 8 corresponds to the assignment function and the assignment means, and the processing in step 9 to the dimension calculation function and the dimension calculation means.

Here is a description of a calculation method adopted in the subroutine for calculating the shell thickness. The following description assumes that one face of a shell comprises a plurality of graphical elements. However, even for the one comprising a single graphical element, it is possible to calculate the shell thickness by the same method.

Firstly, as shown in FIG. 5, when an assigned point is assigned, an imaginary circle is drawn with the assigned point as its center, and the shortest distances between each of the graphical elements ($e_1$ to $e_4$) within a region of the imaginary circle and the assigned point are all calculated. Next, a line perpendicular to the graphical element ($e_1$) having the shortest calculated distance is drawn, and an intersection point $P_0$ ($x_0$, $y_0$) is calculated. Then, an imaginary line is drawn passing through the assigned point with the coordinate $P_0$ as its origin, and an intersection point $P_1$ ($x_1$, $y_1$) with another graphical element ($e_4$) is calculated. Afterwards, a distance d between the intersection point $P_0$ and the intersection point $P_1$ is calculated by the following equation, and the calculation result is designated as the shell thickness.

$$d=\sqrt{(x_1-x_0)^2+(y_1-y_0)^2}$$

According to the design supporting apparatus 10 of the first embodiment, an angular dimension of a taper may be obtained by only assigning one graphical element forming the taper, so that the graphical element assignment operation is simplified. As a result, not only is a graphical element serving as a reference of the angular dimension not necessary, but an angular dimension can be obtained by operations consistent with an operator's understanding. On the other hand, a shell thickness may be obtained by only assigning a point between two graphical elements, so that the graphical element assignment operation is similarly simplified. Accordingly, depending on the type of feature, the angular dimension of a taper or the thickness of a shell can be obtained by one operation, and through the simplification of the graphical element assignment operation, it is possible to reduce an amount of work required to input dimensions of graphical elements.

Figure 6:
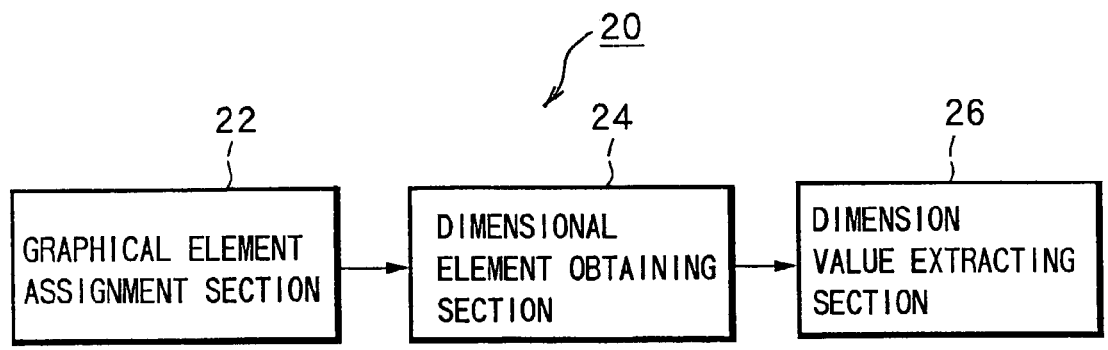
FIG. 6 is a structural diagram showing a second embodiment of a design supporting apparatus embodying the present invention.

FIG. 6 shows a second embodiment of a design supporting apparatus embodying the present invention.

A design supporting apparatus 20 comprises a computer provided with at least a central processing unit (CPU) and a memory, and various functions related to design support are realized by a program loaded into the memory. To be specific, the design supporting apparatus 20 comprises a graphical element assignment section 22, a dimensional element obtaining section 24, and a dimension value extracting section 26.

In the graphical element assignment section 22, a graphical element whose dimensions are to be obtained is assigned by assignment operations by an operator. In the dimensional element obtaining section 24, a dimensional element associated with the assigned element assigned by the graphical element assignment section 22 is obtained. For obtaining a dimensional element, in the case where the assigned element is a line, for example, a dimensional element in which both end points of the line are extensions of the dimension may be obtained. In the dimension value extracting section 26, a display character string representing a dimension value is extracted from the dimensional element obtained by the dimensional element obtaining section 24, and designated as a dimension of the assigned element.

Here, a graphical element assignment function and graphical element assignment means, a dimensional element obtaining function and dimensional element obtaining means, and a dimension value extracting function and dimension value extracting means are realized in software by the graphical element assignment section 22, the dimensional element obtaining section 24 and the dimension value extracting section 26, respectively.

Figure 7:
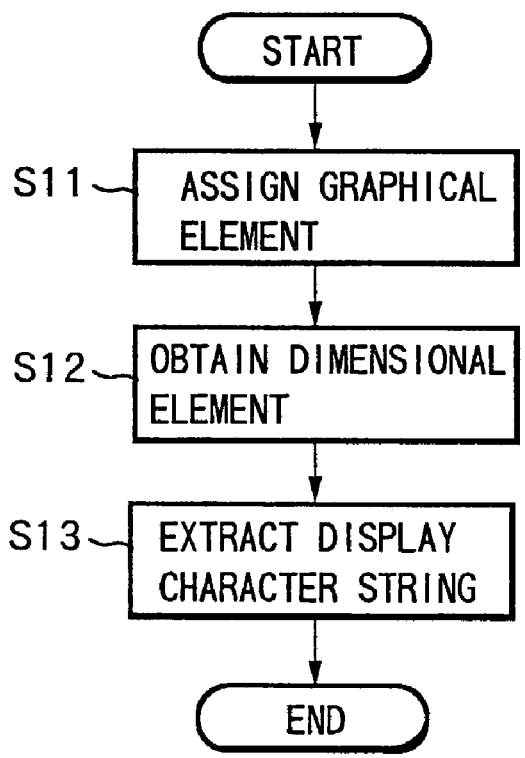
FIG. 7 is a flow chart showing processing to be executed in the above embodiment.

Next is a description of the operation of this design supporting apparatus 20 with reference to the flow chart shown in FIG. 7.

In step 11, a graphical element whose dimension is to be obtained is assigned by assignment operations by the operator. In step 12, a dimensional element associated with the assigned element is obtained. In step 13, a display character string representing a dimension value is extracted from the dimensional element obtained, and designated as a dimension of the assigned element. Here, the processing in step 11, step 12 and step 13 correspond to the graphical element assignment function and graphical element assignment means, the dimensional element obtaining function and dimensional element obtaining means, and the dimension value extracting function and dimension value extracting means, respectively.

Figure 8:
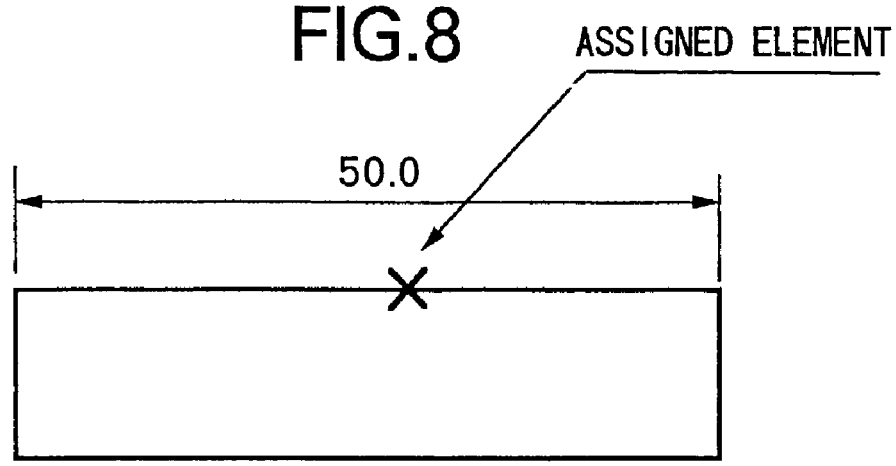
FIG. 8 is an explanatory diagram of a method of obtaining a dimension of a graphical element.

According to the design supporting apparatus 20 of the second embodiment, as shown in FIG. 8, when obtaining the dimensions of a graphical element, if the graphical element is assigned directly, then the dimension values are extracted from the dimensional element associated with the graphical element. Therefore, for example, even if the middle part of a drawing element with a long shape is omitted, or the graphical element is created by single precision, or the graphical element and the dimension value are not consistent with each other, it is possible to obtain a correct dimension value of the graphical element.

If a program realizing such a function is stored on a computer readable recording medium such as CD-ROM, DVD-ROM or the like, for example, it is possible to distribute a design supporting program according to the present invention to the market place. Furthermore, a person who obtains such a recording medium can construct a design supporting apparatus according to the present invention easily using a general computer system.

What is claimed is:

1. A design supporting program for realizing on a computer: an assignment function for assigning a graphical element or a point between two graphical elements on a two-dimensional drawing; a type determination function for determining a type of feature associated with the graphical element or the point assigned by said assignment function; and a dimension calculation function for calculating a dimension that characterizes said feature based on the type of feature determined by said type determination function.

2. A design supporting program for realizing on a computer: an assignment function for assigning a graphical element or a point between two graphical elements on a two-dimensional drawing; a type determination function for determining a type of feature associated with the graphical element or the point assigned by said assignment function; and a dimension calculation function for calculating a dimension that characterizes said feature based on the type of feature determined by said type determination function, wherein, when it is determined by said type determination function that the type of feature is a taper, said dimension calculation function designates an angle formed by the graphical element assigned by said assignment function and an axis direction of the taper, as an angular dimension of said taper.

3. A design supporting program for realizing on a computer: an assignment function for assigning a graphical element or a point between two graphical elements on a two-dimensional drawing; a type determination function for determining a type of feature associated with the graphical element or the point assigned by said assignment function; and a dimension calculation function for calculating a dimension that characterizes said feature based on the type of feature determined by said type determination function, wherein, when it is determined by said type determination function that the type of feature is a taper, said dimension calculation function designates the smaller of an angle formed by the graphical element assigned by said assignment function and a vertical direction, and an angle formed by said graphical element and a horizontal direction, as an angular dimension of said taper.

4. A design supporting program for realizing on a computer: an assignment function for assigning a graphical element or a point between two graphical elements on a two-dimensional drawing; a type determination function for determining a type of feature associated with the graphical element or the point assigned by said assignment function; and a dimension calculation function for calculating a dimension that characterizes said feature based on the type of feature determined by said type determination function, wherein, when it is determined by said type determination function that the type of feature is a shell, said dimension calculation function designates a distance between a graphical element with the shortest distance from the point assigned by said assignment function and another graphical element on an opposite side of said point, as a linear dimension indicating a thickness of said shell.

5. A design supporting program for realizing on a computer: a graphical element assignment function for assigning a graphical element on a two-dimensional drawing; a dimensional element obtaining function for obtaining a dimensional element associated with the graphical element assigned by said graphical element assignment function; and a dimension value extraction function for extracting a character string representing a dimension value from the dimensional element obtained by said dimensional element obtaining function, to designate this as a dimension of the graphical element assigned by said graphical element assignment function.

6. A design supporting method comprising: assigning a graphical element or a point between two graphical elements on a two-dimensional drawing; determining a type of feature associated with the assigned graphical element or point, and calculating a dimension that characterizes said feature based on the type of feature determined.

7. A design supporting method comprising: assigning a graphical element or a point between two graphical elements on a two-dimensional drawing; determining a type of feature associated with the assigned graphical element or point, and calculating a dimension that characterizes said feature based on the type of feature determined, wherein, when it is determined that the type of feature is a taper, an angle formed by the assigned graphical element and an axis direction of the taper is designated as an angular dimension of said taper, for the dimension that characterizes said feature.

8. A design supporting method comprising: assigning a graphical element or a point between two graphical elements on a two-dimensional drawing; determining a type of feature associated with the assigned graphical element or point, and calculating a dimension that characterizes said feature based on the type of feature determined wherein, when it is determined that the type of feature is a taper, the smaller of an angle formed by the assigned graphical element and a vertical direction, and an angle formed by said graphical element and a horizontal direction is designated as an angular dimension of said taper, for the dimension that characterizes said feature.

9. A design supporting method comprising: assigning a graphical element or a point between two graphical elements on a two-dimensional drawing; determining a type of feature associated with the assigned graphical element or point, and calculating a dimension that characterizes said feature based on the type of feature determined wherein, when it is determined that the type of feature is a shell, a distance between a graphical element with the shortest distance from the assigned point and another graphical element on an opposite side of said point is designated as a linear dimension indicating a thickness of said shell, for the dimension that characterizes said feature.

10. A design supporting method comprising: assigning a graphical element on a two-dimensional drawing; obtaining a dimensional element associated with the assigned graphical element; and extracting a character string representing a dimension value from the dimensional element obtained, to designate this as a dimension of the assigned graphical element.

11. A design supporting apparatus comprising: assignment means for assigning a graphical element or a point between two graphical elements on a two-dimensional drawing; type determination means for determining a type of feature associated with the graphical element or the point assigned by said assignment means; and dimension calculation means for calculating a dimension that characterizes said feature based on the type of feature determined by said type determination means.

12. A design supporting apparatus comprising: graphical element assignment means for assigning a graphical element on a two-dimensional drawing; dimensional element obtaining means for obtaining a dimensional element associated with the graphical element assigned by said graphical element assignment means; and dimension value extraction means for extracting a character string representing a dimension value from the dimensional element obtained by said dimensional element obtaining means, to designate this as a dimension of the graphical element assigned by said graphical element assignment means.

13. A computer-readable recording medium recorded with a design supporting program for realizing on a computer: an assignment function for assigning a graphical element or a point between two graphical elements on a two-dimensional drawing; a type determination function for determining a type of feature associated with the graphical element or the point assigned by said assignment function; and a dimension calculation function for calculating a dimension that characterizes said feature based on the type of feature determined by said type determination function.

14. A computer-readable recording medium recorded with a design supporting program for realizing on a computer: a graphical element assignment function for assigning a graphical element on a two-dimensional drawing; a dimensional element obtaining function for obtaining a dimensional element associated with the graphical element assigned by said graphical element assignment function; and a dimension value extraction function for extracting a character string representing a dimension value from the dimensional element obtained by said dimensional element obtaining function, to designate this as a dimension of the graphical element assigned by said graphical element assignment function.

* * * * *